Feb. 8, 1927. 1,616,506
C. NEWMAN
RESILIENT WHEEL FOR MOTOR AND OTHER VEHICLES
Filed March 23, 1923
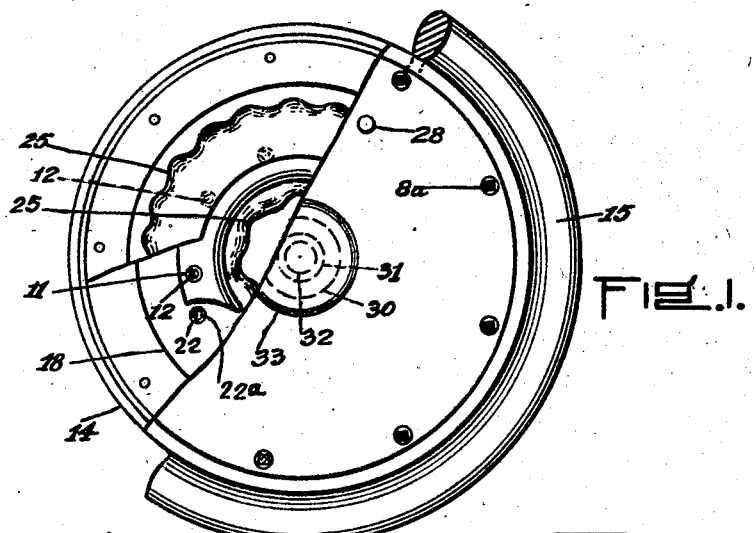
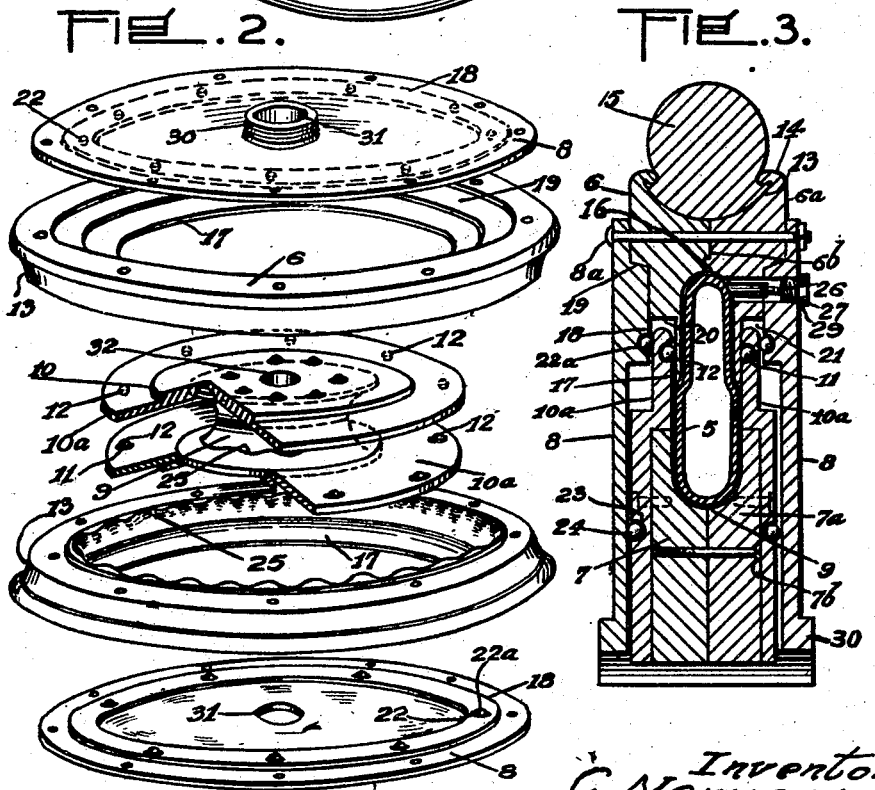
Inventor
C. Newman Patented Feb. 8, 1927.

1,616,506

UNITED STATES PATENT OFFICE.

CHARLES NEWMAN, OF NEWTOWN, NEW SOUTH WALES, AUSTRALIA.

RESILIENT WHEEL FOR MOTOR AND OTHER VEHICLES.

Application filed March 23, 1923, Serial No. 627,123, and in Australia October 10, 1922.

The object of this invention is to provide a resilient wheel in which the pneumatic tube is situated between the hub and the rim, thereby eliminating all risks of punctures, such as occur with the pneumatic tyre at present in use.

It consists of a rim divided into two parts, the line of division being centrally through the rim in the plane of rotation. This rim is provided with means for securing a solid rubber tyre around its periphery, the inner faces of the two parts being provided with flanges that form a deep annular channel when the two parts are in position. A sheave like member also divided into two parts similarly to the rim and having a deep flange at each side forms the hub of the wheel, the annular channel formed by these flanges co-acting with the annular channel in the rim to form an approximately oval shaped chamber between the rim and the hub. The base of each of the channels just referred to is corrugated the pneumatic tube that is housed within the chamber being provided with similar corrugations that engage with the corrugations in the channels so as to prevent the tube or band creeping within the chamber. The parts of the wheel are secured together by means of discs that are bolted to each side of the rim the bolts being placed at intervals and passing through the discs and the two parts of the rim. These discs are provided with centrally situated circular openings of a larger diameter than the bore of the hub so that the motion of the wheel relative to the hub may be eccentric. The opposing faces of various parts are provided with antifriction ball bearings so arranged as to prevent the opposing faces from actually touching one another. A centrally situated circular flange upon the outer face of one of the discs on the outside of the wheel is provided with a screw cap to exclude dirt or moisture.

A more detailed description will now be given and reference will be made to the accompanying drawings in which:—

Fig. 1 is a side elevation of the wheel, portions of which have been broken away to show the relative position of the various parts.

Fig. 2 is a perspective view of certain of the parts of the wheel placed in the order in which they are assembled.

Fig. 3 is a central sectional elevation of one-half of the wheel.

The pneumatic tube 5 in this wheel is placed between the rim 6—6$^a$ and the hub 7—7$^a$, the latter member being slidably mounted between two discs 8, that are secured, one on each side of the wheel, by means of bolts 8$^a$ that pass through the two halves 6—6$^a$ of the rim, so that resilience is obtained by the compression of the pneumatic tube between the hub and the rim. The hub 7—7$^a$ is divided into two halves, and rigidly secured by countersunk screws 7$^b$, the heads of the screws being flush with the inside face of one of the plates 10, the divisional line being in the plane of rotation, and is shaped like a sheave having a deep annular channel 9; to each side of the hub is secured in any suitable manner a circular metal plate 10 the central portion of the inner face being pressed outwardly to form a recess to receive the side of the hub, the annulus 10$^a$ extending beyond the periphery of the side of the hub and being provided, upon its inner face, with hemispherical recesses 11 to receive the balls 12. The rim of the wheel is formed into two halves 6 and 6$^a$, the divisional line 6$^b$ being in the plane of rotation. Upon the peripheral surface of each half of the rim is a transversely concave annular recess 13 the outer ends of which merge into inwardly turned annular beads 14 by means of which the solid rubber tyre 15 is secured to the rim.

Formed centrally upon the inner surface of the rim 6—6$^a$ is an annular channel 16 each side of which is extended radially inward to form flanges 17 upon the outer surfaces of which the balls 12 may roll. When the parts are secured together the channel 16, flange 17, annulus 10$^a$ and annular channel 9 together form an approximately oval shaped annular chamber that forms a housing for the pneumatic tube 5.

The discs 8 are provided with annular ribs 18 near their peripheries, each half of the rim 6—6$^a$ being provided with an annular rabbet 19 to form a bearing surface for these ribs. Between the annular rabbets 19 and the flanges 17 each half of the rim has a second annular rabbet 20 which, when the parts are in position forms a recess 21 between the rib 18 and the flange 17, the depth of the recess being such as to allow the annulus 10ᵃ of the plate 10 to move radially in any direction. At intervals around the rib 18 are a suitable number of hemispherical recesses 22 to accomodate balls 22ᵃ so as to form antifriction bearings between the rib 18 and the annulus 10ᵃ. Similar hemispherical recesses 23 are cut upon the outer faces of the plates 10 to accommodate balls 24 that form antifriction bearings between the outer faces of the plates and the inner faces of the discs 8.

The bases of the channels 9 and 16 are each transversely corrugated as seen at 25 in Figs. 1 and 2 and the inner and outer peripheries of the annular tube 5 will be correspondingly corrugated in order to prevent the rim 6—6ᵃ from "creeping".

The tube 5 may be made of rubber or rubber and canvas and will be provided with a tube 26 having an air valve 27 that lies in the passage 28 cut through the disc 8, rib 18, and one-half 6ᵃ of the rim for the purpose of providing a means whereby the pneumatic tube may be inflated by a pump in the ordinary way. The passage 28 may be closed by a screw cap 29.

The metal discs 8 are provided with a central hollow boss 30 the hole 31 being of a larger diameter than the bore 32 of the hub 7—7ᵃ to enable the hub and its attachments to slide radially in any direction within the rim between the discs 8 as previously described so that the movement of the rim may be eccentric in relation to the hub. The boss on the outer face of the wheel may be provided with a screw cap 33 for the purpose of excluding dirt or moisture.

I claim:—

1. In a resilient wheel structure, a hub part, a rim part, a cushioning element interposed between the hub and rim parts, overlapping guide flanges carried by the hub and the rim parts and permitting radial displacement of the rim part relative to the hub part, said flanges overlying and partially housing the cushioning element, and dust excluding plates carried by the rim part and extending inwardly and overlying the hub part to prevent admission of foreign matter to the overlapping flanges.

2. In a resilient wheel structure, a hub part, a rim part, overlapping guide flanges carried by the hub and rim parts and permitting radial movement of the rim part relative to the hub part, and protective members carried by the rim part extending inwardly thereof and overlying a portion of the hub part lying inwardly of the guide flanges carried thereby, said protective members overlying the points of overlap of the guide flanges, and lateral projections on said protective members having sliding engagement with the hub part carried flanges whereby to assist in guiding the radial movement of the rim part.

3. A resilient wheel structure comprising a hub part, said hub part including a central member and opposed side members removably secured to the central member and having offset circumferential portions partially embracing the periphery of the central member and constituting inner guide flanges, a divided rim part, flanges carried by the divisions of the rim part having sliding contact with the first mentioned flanges whereby to guide the radial movement of the rim part relative to the hub part and a cushion element confined between the central member of the hub part and the divided rim part and between the several flanges.

4. A resilient wheel structure comprising a hub part, said hub part including a central member and opposed side members removably secured to the central member and having offset circumferential portions partially embracing the periphery of the central member and constituting inner guide flanges, a divided rim part, flanges carried by the divisions of the rim part having sliding contact with the first mentioned flanges whereby to guide the radial movement of the rim part relative to the hub part and a cushion element confined between the central member of the hub part and the divided rim part and between the several flanges, removable protective members arranged on opposite sides of the divided rim part and overlying the side members of the hub part whereby to prevent admission of foreign matter to the points of engagement of the flanges.

In testimony whereof I have signed my name to this specification.

CHARLES NEWMAN.